US012605831B2

(12) United States Patent　　(10) Patent No.:　US 12,605,831 B2
Fujisawa　　(45) Date of Patent:　Apr. 21, 2026

(54) ROBOT CONTROLLER AND ROBOT CONTROL SYSTEM

(71) Applicant: NACHI-FUJIKOSHI CORP., Tokyo (JP)

(72) Inventor: Tatsuro Fujisawa, Toyama (JP)

(73) Assignee: NACHI-FUJIKOSHI CORP., Tokyo (JP)

( * ) Notice: Subject to any disclaimer, the term of this patent is extended or adjusted under 35 U.S.C. 154(b) by 472 days.

(21) Appl. No.: 18/328,227

(22) Filed: Jun. 2, 2023

(65) Prior Publication Data

US 2023/0390929 A1　　Dec. 7, 2023

(30) Foreign Application Priority Data

Jun. 3, 2022　　(JP) ................................. 2022-090750

(51) Int. Cl.
　　*B25J 9/16*　　　　(2006.01)
(52) U.S. Cl.
　　CPC .................................. *B25J 9/1664* (2013.01)
(58) Field of Classification Search
　　CPC ............ G05B 2219/40202; G05B 2219/40203
　　See application file for complete search history.

(56) References Cited

U.S. PATENT DOCUMENTS

| | | | | |
|---|---|---|---|---|
| 10,118,295 | B2 * | 11/2018 | Oumi | ..................... B25J 9/1674 |
| 2017/0305019 | A1 * | 10/2017 | Pomrehn | .................. B25J 19/06 |

| | | | | |
|---|---|---|---|---|
| 2017/0320212 | A1 * | 11/2017 | Frisk | ......................... B25J 19/06 |
| 2019/0063907 | A1 * | 2/2019 | Grau | ......................... G06T 7/521 |
| 2019/0299420 | A1 * | 10/2019 | Nakayama | ............... B25J 13/06 |
| 2021/0069907 | A1 * | 3/2021 | Vu | .......................... B25J 9/1694 |
| 2022/0176560 | A1 * | 6/2022 | Akagi | .................... B25J 9/1676 |

FOREIGN PATENT DOCUMENTS

| | | |
|---|---|---|
| JP | 4764070 B2 | 8/2011 |
| JP | 2019-058990 A | 4/2019 |
| JP | 2021-130142 A | 9/2021 |

* cited by examiner

*Primary Examiner* — Nhi Q Bui
(74) *Attorney, Agent, or Firm* — Crowell & Moring LLP

(57)　　　　　ABSTRACT

A robot controller that can accurately determine whether a collaborative robot is in either a collaborative state or a non-collaborative state. The robot controller includes: an acquisitor acquiring a prescribed detection range from a detection device detecting the human present in the detection range; a range determinator determining whether the detection range acquired by the acquisitor includes a set range set for a collaborative robot collaborating with the human so as to include a predetermined range regarding the robot; a speed determinator determining a magnitude relationship between an operating speed of the collaborative robot and a first speed; and a collaborative state determinator determining whether the collaborative robot is in either the collaborative state of being operable with the human or the non-collaborative state of not being operable therewith when the human enters the predetermined range, based on determination results of the range determinator and speed determinator.

4 Claims, 5 Drawing Sheets

ROBOT CONTROLLER AND ROBOT CONTROL SYSTEM

CROSS-REFERENCE TO RELATED APPLICATION

This application is based upon and claims the benefit of priority from Japanese Patent Application No. 2022-090750 filed on Jun. 3, 2022, the contents all of which are incorporated herein by reference.

FIELD

The present invention relates to a robot controller and a robot control system that control an operation of a collaborative robot.

BACKGROUND

There is a conventionally known robot control system that includes a detection device and a robot controller. The detection device detects a human present within a prescribed detection range from a collaborative robot that operates collaboratively with the human within a collaborative range. The collaborative range is a range located at a predetermined distance from the robot and in which the human can be present. The robot controller controls the operation of the collaborative robot in accordance with the detection results made by the detection device. The collaborative robot operates by reducing its operating speed when the human is present within the collaborative range. It is noted that the detection range is normally set on the detection device in such a manner as to include, within its own range, the entire collaborative range.

In this regard, Japanese Patent Application Publication (JP-A) No. 2019-058990 discloses a configuration in which a controller sequentially predicts an operating area of a robot until a given time, validates the detection result of a sensor in an area including the predicted operating area, and restricts the operation of the robot when detecting the entry of a human within this area, for which the detection result of the sensor is validated.

In the technology described in JP-A No. 2019-058990, in a case where a human enters the detection range, the controller reduces the operating speed of the collaborative robot to a predetermined speed or temporarily stops the operation of the collaborative robot itself until the human enters the collaborative range. Here, the detection range is usually set on the detection device to be wider than the collaborative range by a distance that the human can move in the time it takes to reduce the operating speed of the collaborative robot to the predetermined speed.

However, the technology described in JP-A No. 2019-058990 does not allow the controller to grasp the detection range set on the detection device. For this reason, there is a problem that the technology cannot determine with high accuracy whether the operating state of the collaborative robot is either a collaborative state or a non-collaborative state. The collaborative state is a state in which the collaborative robot can operate with a human when the human may enter a predetermined range (e.g., the collaborative range) regarding the collaborative robot (hereinafter simply referred to a collaborative state). The non-collaborative state is a state in which the collaborative robot cannot operate with a human when the human may enter the predetermined range (e.g., the collaborative range) (hereinafter simply referred to the non-collaborative state).

The present invention has been made in view of the problems described above, and an object of the present invention is to provide a robot controller and a robot control system that can determine with high accuracy whether the operating state of a collaborative robot is either the collaborative state or the non-collaborative state.

SUMMARY

To solve the above-mentioned problems, a robot controller of the present invention includes: an acquisitor acquiring a prescribed detection range from a detection device detecting a human present in the detection range; a range determinator determining whether or not the detection range acquired by the acquisitor includes a set range that is set for a collaborative robot so as to include a predetermined range regarding the collaborative robot collaborating with the human; a speed determinator determining a magnitude relationship between an operating speed of the collaborative robot and a first speed; and a collaborative state determinator determining whether an operating state of the collaborative robot is either a collaborative state or a non-collaborative state in accordance with determination results of the range determinator and the speed determinator, the collaborative state being a state in which the collaborative robot is operable with the human when the human enters the predetermined range, the non-collaborative state being a state in which the collaborative robot is not operable with the human when the human enters the predetermined range.

The collaborative state determinator determines that the operating state is the collaborative state when the determination result of the range determinator is an affirmative determination that the detection range includes the set range and the speed determinator determines that the operating speed is lower than or equal to the first speed.

The speed determinator further determines a magnitude relationship between the operating speed and a second speed that is lower than the first speed, and the collaborative state determinator determines that the operating state is the collaborative state when the speed determinator indicates that the operating speed is lower than or equal to the second speed.

The predetermined range is a predetermined collaborative range from the collaborative robot, and the range determinator sets the set range in accordance with a time during which the operating speed is reduced from the first speed to the second speed, a third speed regarding a moving speed of the human, and the collaborative range.

The predetermined range is an operating range in which the collaborative robot operates, and the range determinator sets the set range in accordance with a time during which the operating speed is reduced from the first speed to the second speed, a third speed regarding the moving speed of the human, and the operating range.

A robot control system of the present invention includes: a collaborative robot collaborating with a human; an acquisitor acquiring a prescribed detection range from a detection device detecting the human present in the detection range; a range determinator determining whether or not the detection range acquired by the acquisitor includes a set range that is set for the collaborative robot so as to include a predetermined range regarding the collaborative robot; a speed determinator determining a magnitude relationship between an operating speed of the collaborative robot and a first speed; and a collaborative state determinator determining whether an operating state of the collaborative robot is either a collaborative state or a non-collaborative state in accordance with determination results of the range determinator and the speed determinator, the collaborative state being a state in which the collaborative robot is operable with the human when the human may enter the predetermined range, the non-collaborative state being a state in which the collaborative robot is not operable with the human when the human may enter the predetermined range.

According to the present invention, the robot controller and the robot control system can determine with high accuracy whether the operating state of the collaborative robot is either the collaborative state or the non-collaborative state.

The above and other objects, features, and advantages of the present invention will become more apparent from the following description when taken in conjunction with the accompanying drawings in which a preferred embodiment of the present invention is shown by way of illustrative example.

DETAILED DESCRIPTION

Figure 1:
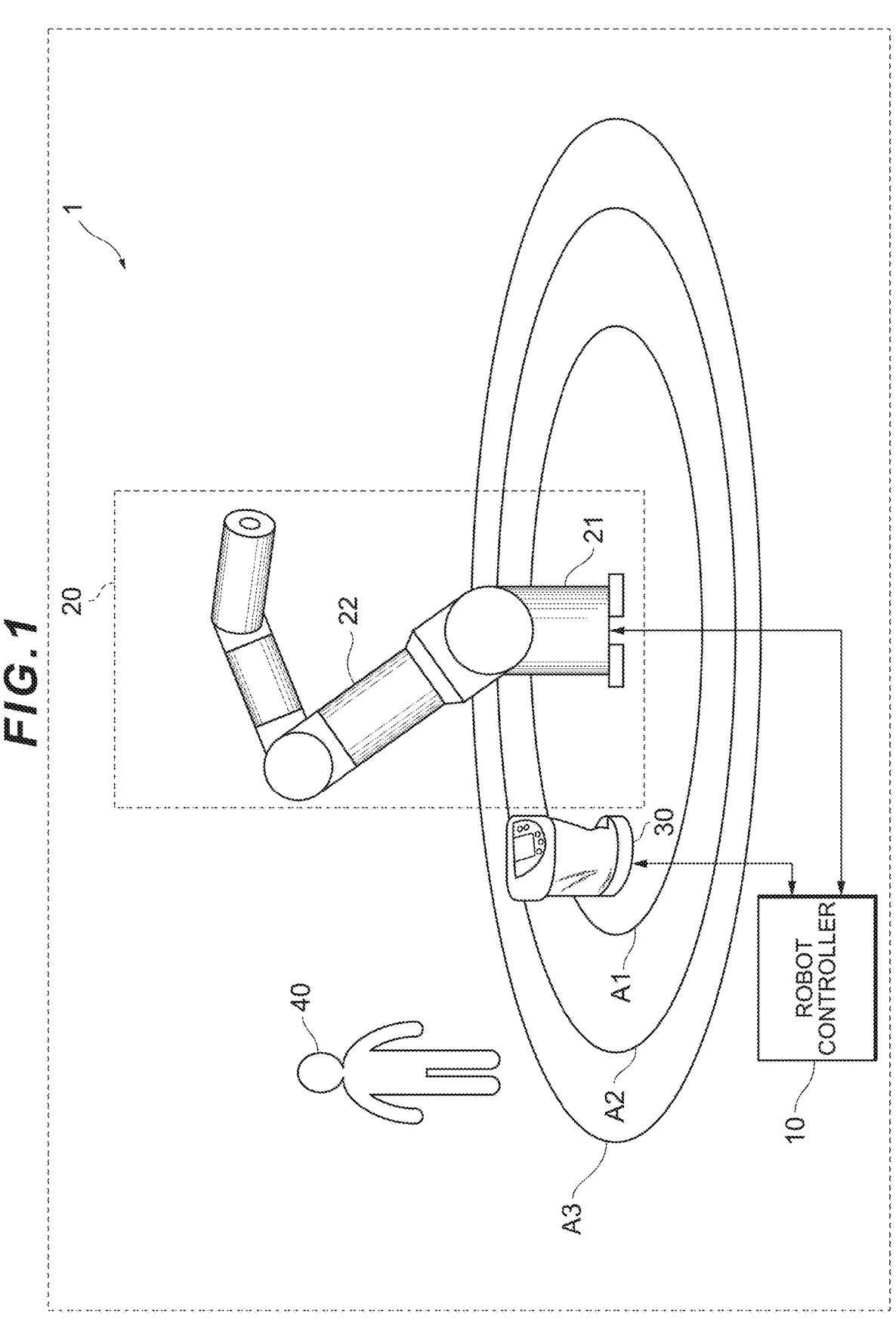
FIG. 1 is a diagram schematically showing a configuration of a robot control system according to a first embodiment.

Hereinafter, embodiments of the present invention (hereinafter referred to as the "present embodiment") will be described with reference to the accompanying drawings.

To make the understanding of the description easier, the same component and step are denoted by the same reference characters as much as possible in each drawing, and a duplicated description thereof is omitted.

First Embodiment

First, a first embodiment will be described.
<Configuration>

FIG. 1 is a diagram schematically showing a configuration of a robot control system 1 according to the first embodiment. As shown in FIG. 1, the robot control system 1 mainly includes, for example, a robot controller 10, a collaborative robot 20, and a detection device 30.

The robot controller 10 is a device that acquires information transmitted from the detection device 30 and controls the operation of the collaborative robot 20 in accordance with the acquired information. For the collaborative robot 20, the robot controller 10 sets a collaborative range A1, which is a range surrounding the collaborative robot 20, and a deceleration range A2, which is wider than the collaborative range A1 by a predetermined distance. From the information transmitted from the detection device 30, the robot controller 10 acquires a detection range A3 set on the detection device 30 to detect whether or not a human 40 is present therein. The robot controller 10 calculates an operating speed of the collaborative robot 20 based on information transmitted from the collaborative robot 20. Further, the robot controller 10 determines whether the collaborative robot 20 is in either the collaborative state or the non-collaborative state, based on the detection range A3, the deceleration range A2, and the operating speed of the collaborative robot 20, and then outputs the determination result to the outside so that the human 40 can recognize it. It is noted that the robot controller 10 sets the collaborative range A1 to include an entire range in which an articulated arm 22 included in the collaborative robot 20 can reach when the collaborative robot 20 operates. In the first embodiment, the collaborative state is a state in which the collaborative robot 20 is operable with the human 40 when the human 40 may enter the predetermined range regarding the collaborative robot 20 (collaborative range A1 in the first embodiment). The non-collaborative state is a state in which the collaborative robot 20 is not operable with the human 40 when the human 40 may enter the predetermined range (collaborative range A1 in the first embodiment).

The collaborative robot 20 is a robot that performs a predetermined processing operation on a workpiece (not shown) or the like in accordance with the operation control of the robot controller 10. The collaborative robot 20 is disposed with the detection device 30 in a space where the human 40 may be present so as to perform the operation. As is well known, the collaborative robot 20 operates (cooperates) with the human 40 who is present in the same space without being enclosed by a fence or the like. The collaborative robot 20 mainly includes, for example, a base 21 and the articulated arm 22.

The detection device 30 is, for example, an area sensor. The detection device 30 sets the detection range A3 and detects whether or not the human 40 is present within the set detection range A3. The detection device 30 is disposed with the collaborative robot 20 in the space where the human 40 may be present to perform the operation. The detection device 30 transmits information about the detection range A3 (location, size, or the like) and the detection result to the robot controller 10.

Figure 2:
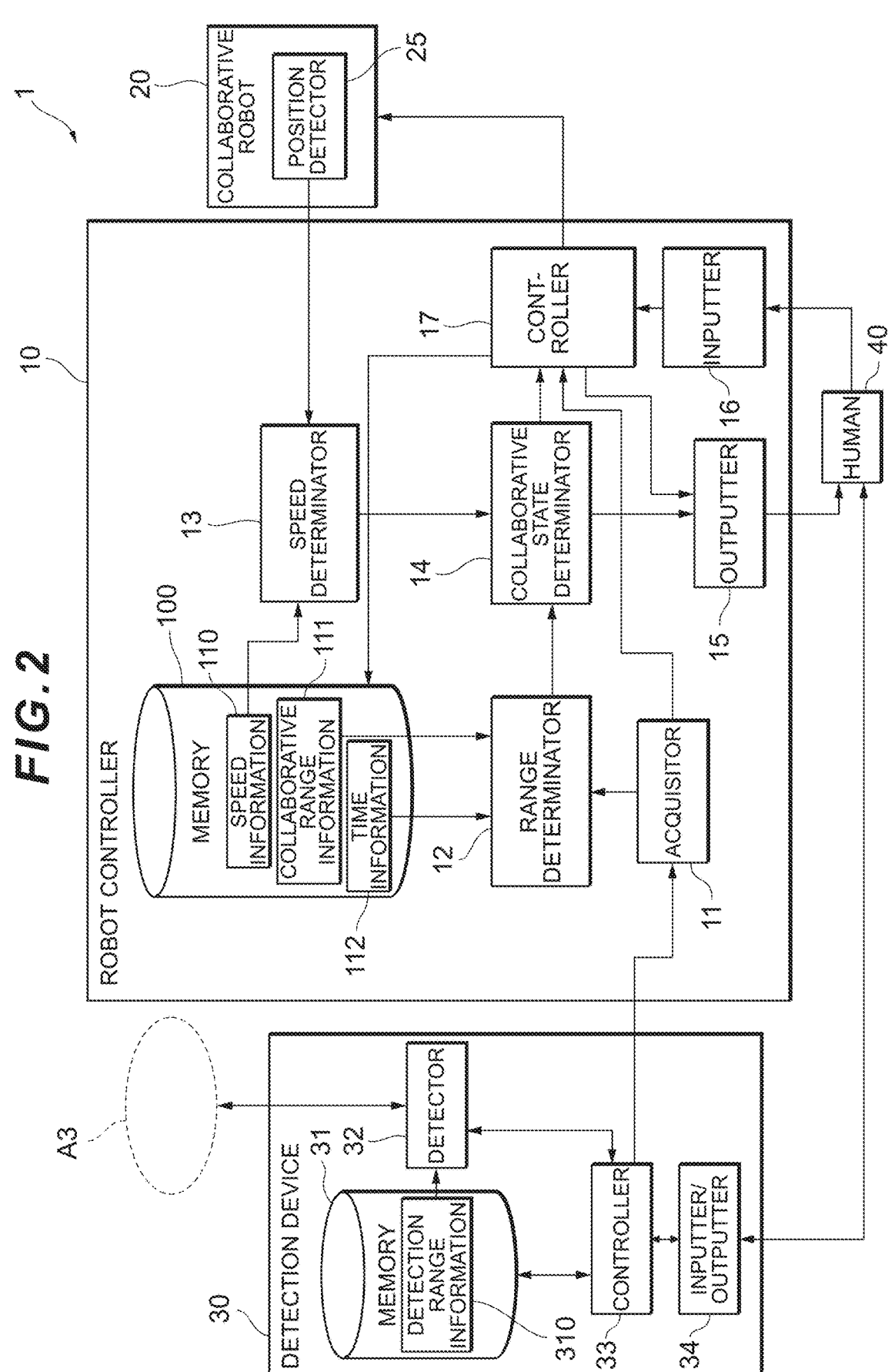
FIG. 2 is a diagram showing a circuit configuration of the robot control system shown in FIG. 1.

FIG. 2 is a diagram showing a circuit configuration of the robot control system 1 shown in FIG. 1. As shown in FIG. 2, the robot controller 10 mainly includes, for example, an acquisitor 11, a range determinator 12, a speed determinator 13, a collaborative state determinator 14, an outputter 15, an inputter 16, a controller 17, and a memory 100.

The memory 100 stores therein information required to determine whether or not the detection range A3 is correctly set on the detection device 30. Specifically, the memory 100 stores therein, for example, speed information 110, collaborative range information 111, and time information 112.

The speed information 110 is information about the operating speed of the collaborative robot 20. For example, the speed information 110 includes: a second speed v2, which is an operating speed at which the collaborative robot 20 can operate even when the human 40 is present within the collaborative range A1; a first speed v1, which is an operating speed of the collaborative robot 20 that is faster than the second speed v2 and can be reduced to the second speed v2 until the human 40 reaches inside of the collaborative range A1 from the outer periphery of the deceleration range A2; and a third speed v3 regarding the moving speed of the human 40. Here, the third speed v3 is a speed which is made faster by a predetermine margin than the maximum moving speed vm that can be achieved by the human 40 when the human 40 moves on his/her own without using a vehicle or other means of movement.

The collaborative range information 111 is information about the range including the collaborative robot 20. The collaborative range information 111 includes, for example, information (location, size, or the like) about the collaborative range A1 and information (location, size, or the like) about the deceleration range A2.

The time information 112 is information about the time taken for the collaborative robot 20 to reduce its operating speed. The time information 112 includes, for example, a deceleration time is that is taken for the collaborative robot 20 to reduce its operating speed from the first speed v1 to the second speed v2.

The acquisitor 11 acquires the information (location, size, or the like) about the detection range A3 from the detection device 30 that detects the human 40 present in the detection range A3. The acquisitor 11 transmits the acquired information about the detection range A3 to the range determinator 12. The acquisitor 11 acquires, from the detection device 30, the detection result about whether or not the human 40 is present within the detection range A3. The acquisitor 11 transmits the acquired detection result to the controller 17.

The range determinator 12 determines whether or not the detection range A3 acquired by the acquisitor 11 includes a set range that is set for the collaborative robot 20 so as to include the predetermined range regarding the collaborative robot 20. In the first embodiment, the predetermined range is the collaborative range A1. Furthermore, in the first embodiment, the set range is the deceleration range A2. Specifically, in the first embodiment, the set range is the deceleration range A2. The range determinator 12 determines whether or not the detection range A3 transmitted from the acquisitor 11 includes the entire deceleration range A2 (set range) included in the collaborative range information 111 stored in the memory 100. The range determinator 12 outputs the result of this determination to the collaborative state determinator 14.

The range determinator 12 sets the deceleration range A2 (set range) in accordance with the deceleration time ts, the third speed v3 and the collaborative range A1 (predetermined range). Specifically, the range determinator 12 reads out the deceleration time ts and the third speed v3 from the memory 100 and multiplies the deceleration time ts by the third speed v3. The range determinator 12 sets the deceleration range A2 (set range) such that the outer periphery of the deceleration range A2 is located far from the outer periphery of the collaborative range A1 (predetermined range) at least by a distance obtained by the multiplication result. The range determinator 12 stores the set deceleration range A2 (set range) in the memory 100.

The speed determinator 13 determines the magnitude relationship between the operating speed of the collaborative robot 20 and the first speed v1. Specifically, the speed determinator 13 calculates an operating speed of the collaborative robot 20 based on position information about a position detector 25 as transmitted from the position detector 25 of the collaborative robot 20. Subsequently, the speed determinator 13 determines the magnitude relationship between the first speed v1 and the calculated operating speed of the collaborative robot 20 by reading out the first speed V1 from the memory 100. The speed determinator 13 also determines the magnitude relationship between the second speed v2 and the calculated operating speed of the collaborative robot 20 by reading out the second speed v2 from the memory 100. The speed determinator 13 outputs each determination result to the collaborative state determinator 14.

Based on the determination results of the range determinator 12 and the speed determinator 13, the collaborative state determinator 14 determines whether the operating state of the collaborative robot 20 is either the collaborative state or the non-collaborative state. Specifically, the collaborative state determinator 14 determines that the operating state of the collaborative robot 20 is the collaborative state when the determination result of the range determinator 12 is an affirmative determination that the detection range A3 includes the above-mentioned set range and the speed determinator 13 determines that the operating speed of the collaborative robot 20 is lower than or equal to the first speed v1. In addition, the collaborative state determinator 14 determines that the operating state of the collaborative robot 20 is the collaborative state also when the speed determinator 13 indicates that the operating speed of the collaborative robot 20 is lower than or equal to the second speed v2.

The relationship between the deceleration range A2 and the detection range A3 shown when the collaborative robot 20 is in the collaborative state will be described with reference to FIG. 1. In FIG. 1, the detection range A3 is set on the detection device 30 so as to include the entire deceleration range A2. Assuming that the operating speed of the collaborative robot 20 is lower than or equal to the first speed v1, the collaborative state determinator 14 determines that the operating state of the collaborative robot 20 is the collaborative state because the detection range A3 includes the set range (deceleration range A2) as shown in FIG. 1.

Returning to FIG. 2, the collaborative state determinator 14 determines that the operating state of the collaborative robot 20 is the non-collaborative state when the determination result of the range determinator 12 is a negative determination that the detection range A3 does not include the above-mentioned set range. Further, the collaborative state determinator 14 determines that the operating state of the collaborative robot 20 is the non-collaborative state also when the determination result of the range determinator 12 is the above-mentioned affirmative determination but the speed determinator 13 determines that the operating speed of the collaborative robot 20 is higher than the first speed v1. The collaborative state determinator 14 outputs the determination result to the controller 17 and the outputter 15.

Figure 3:
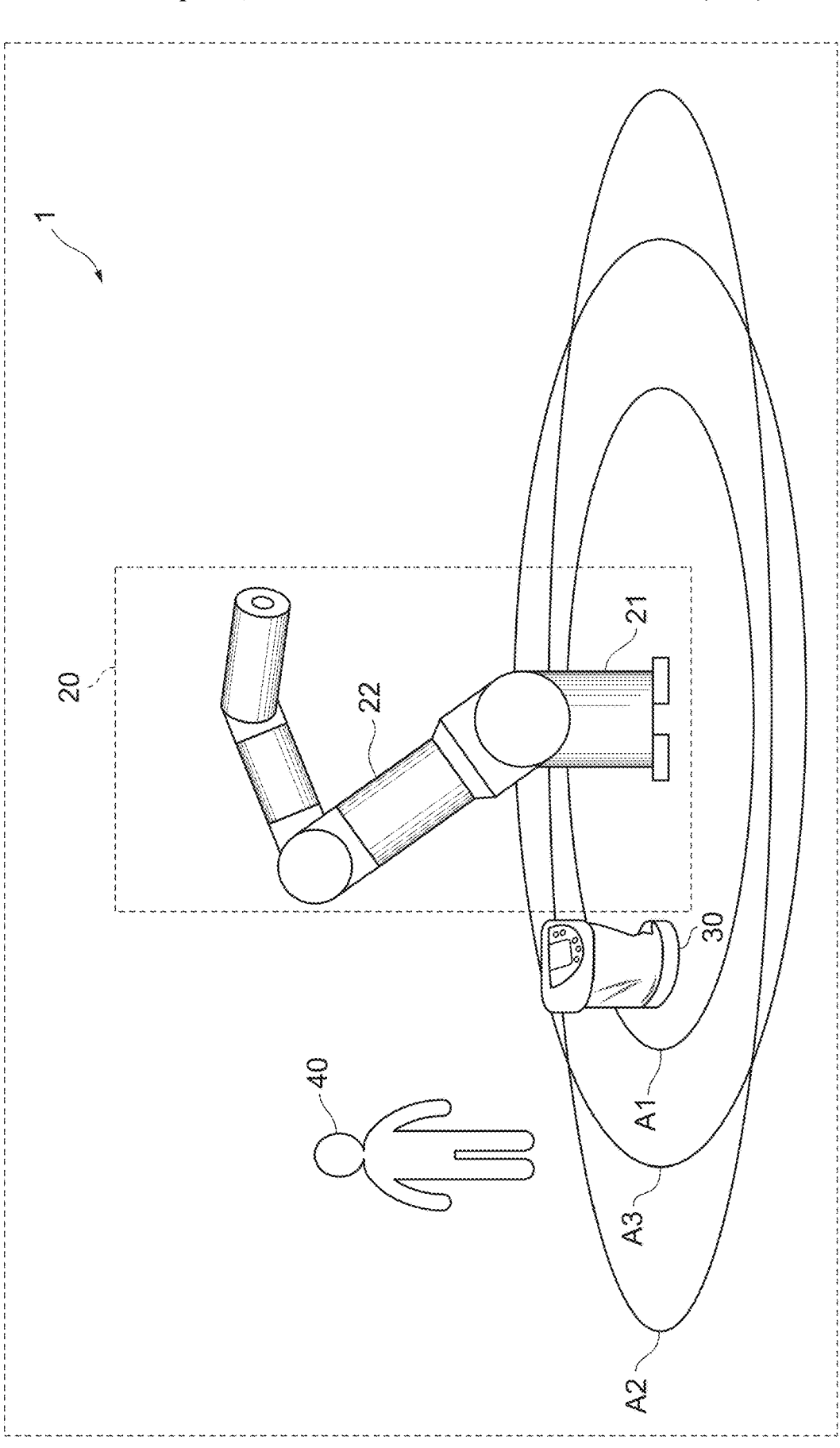
FIG. 3 is a diagram schematically showing the relationship between a detection range and a deceleration range when the detection range is set inappropriately in the robot control system shown in FIG. 1.

An example of the relationship between the deceleration range A2 and the detection range A3 shown when the collaborative robot 20 is in the non-collaborative state will be described with reference to FIG. 3. FIG. 3 is a diagram schematically showing the relationship between the detection range A3 and the deceleration range A2 when the detection range A3 is set inappropriately in the robot control system 1 shown in FIG. 1. In FIG. 3, the detection range A3 is set on the detection device 30 not to include a part of the deceleration range A2. The collaborative state determinator 14 determines that the operating state of the collaborative robot 20 is the non-collaborative state because the detection range A3 does not include a part of the deceleration range A2 (set range) as shown in FIG. 3.

Returning to FIG. 2, the outputter 15 outputs the determination result of the collaborative state determinator 14. The outputter 15 indicates to the human 40 whether the operating state of the collaborative robot 20 is either the collaborative state or the non-collaborative state, for example, by displaying the determination result of the collaborative state determinator 14 using a display, a lamp, etc. or indicating it with sound through a speaker, or the like. The outputter 15 may be simply an output terminal. In this case, the outputter 15 outputs the determination result of the collaborative state determinator 14 to an external device different from the robot controller 10 (such as a control system, a display, a lamp, or a speaker, not shown, of facilities such as a factory where the collaborative robot 20 is disposed).

The inputter 16 receives a command input thereto by an operation of the human 40 and outputs the received command to the controller 17. The inputter 16 is, for example, an input device called a teaching pendant, a keyboard, a switch, a mouse, or the like. The inputter 16 may be simply an input terminal. In this case, the inputter 16 receives a command input from the external input device different from the robot controller 10 (such as a teaching pendant, a keyboard, a switch, or a mouse, not shown) and outputs the received command to the controller 17.

The controller 17 controls the operation of the collaborative robot 20 in accordance with either the detection result transmitted from the detection device 30 or the command output from the inputter 16. Specifically, when receiving a command to start or stop the operation of the collaborative robot 20 from the inputter 16, the controller 17 starts or stops the operation of the collaborative robot 20 in accordance with the command. When receiving a command to change the operating speed of the collaborative robot 20 from the inputter 16, the controller 17 changes the operating speed of the collaborative robot 20 in accordance with the command. When receiving, from the inputter 16, a command to provide information about the collaborative robot 20 and the robot controller 10 (operating speed and operating time of the collaborative robot 20, the speed information 110, the collaborative range information 111, the time information 112, etc.), the controller 17 outputs the received information about the collaborative robot 20 and the robot controller 10 to the outputter 15 in accordance with the command.

The operation of the controller 17 when the collaborative state determinator 14 determines that the operating state of the collaborative robot 20 is the collaborative state will be described below. The controller 17 restricts the operation of the collaborative robot 20 such that the operating speed of the collaborative robot 20 is reduced to the second speed v2 when the detection result transmitted thereto from the detection device 30 indicates that the human 40 is present within the detection range A3.

The operation of the controller 17 when the collaborative state determinator 14 determines that the operating state of the collaborative robot 20 is the non-collaborative state will be described below. The controller 17 restricts the operation of the collaborative robot 20 so as to stop the operation of the collaborative robot 20 when the detection result transmitted thereto from the detection device 30 indicates that the human 40 is present within the detection range A3.

The collaborative robot 20 includes, for example, the position detector 25. In the collaborative robot 20, the operation of the articulated arm 22 is controlled in accordance with the operation control performed by the controller 17 of the robot controller 10.

At least one position detector 25 is provided in the articulated arm 22 of the collaborative robot 20. The position detector 25 detects the position of the position detector 25 itself in a space where the collaborative robot 20 is disposed, and transmits the detected position information to the speed determinator 13 of the robot controller 10.

The detection device 30 mainly includes, for example, a memory 31, a detector 32, a controller 33, and an inputter/outputter 34.

The memory 31 stores therein information about the detection range A3 for detecting whether or not the human

40 is present within the detection range A3. Specifically, the memory 31 stores therein, for example, detection range information 310.

The detection range information 310 is information about the detection range A3. The detection range information 310 includes, for example, information (location, size, or the like) about the detection range A3.

The detector 32 determines whether or not the human 40 is present within the detection range A3 stored in the memory 31. The detector 32 transmits the detection result to the acquisitor 11 of the robot controller 10 via the controller 33.

The controller 33 controls the operation of the detection device 30 in accordance with the command output from the inputter/outputter 34. Specifically, when receiving a command to start or stop a detection operation of the detection device 30 from the inputter/outputter 34, the controller 33 starts or stops the detection operation of the detection device 30 in accordance with the command. When the detection device 30 performs the detection operation, the controller 33 receives, from the detector 32, the detection result of whether or not the human 40 is present within the detection range A3, and transmits the received detection result to the acquisitor 11 of the robot controller 10.

When receiving a command to set or change the location and size of the detection range A3 from the inputter/outputter 34, the controller 33 sets or changes the position and size of the detection range A3 in accordance with the command and stores the set or changed contents in the memory 31. When receiving, from the inputter/outputter 34, a command to provide information about the detection device 30 (detection range information 310, detection result and the like), the controller 33 outputs the information about the detection device 30 to the inputter/outputter 34 in accordance with the command.

The inputter/outputter 34 is an interface for receiving the operation performed by the human 40 or showing information to the human 40 by means of screen display, with sound, or the like. The inputter/outputter 34 includes, for example, a keyboard, a switch, and/or a mouse as an input interface. The inputter/outputter 34 includes, for example, a display, a lamp, and/or a speaker as an output interface. The inputter/outputter 34 receives a command input by the human 40 and outputs the received command to the controller 33. The inputter/outputter 34 indicates, to the human 40, information about the detection device 30 output from the controller 33 (detection range information 310, the detection result, and the like) by outputting it on the screen or with sound.

The inputter/outputter 34 may be simply an input/output terminal. In this case, the inputter/outputter 34 receives a command input from the external device different from the detection device 30 (such as a keyboard, a switch, a mouse, or a computer system, not shown) and outputs the received command to the controller 33. The inputter/outputter 34 outputs the information about the detection device 30 (detection range information 310, detection result, and the like) to the external device (such as a display, a lamp, a speaker, or a computer system, not shown) different from the detection device 30.

<Series of Processes>

Figure 4:
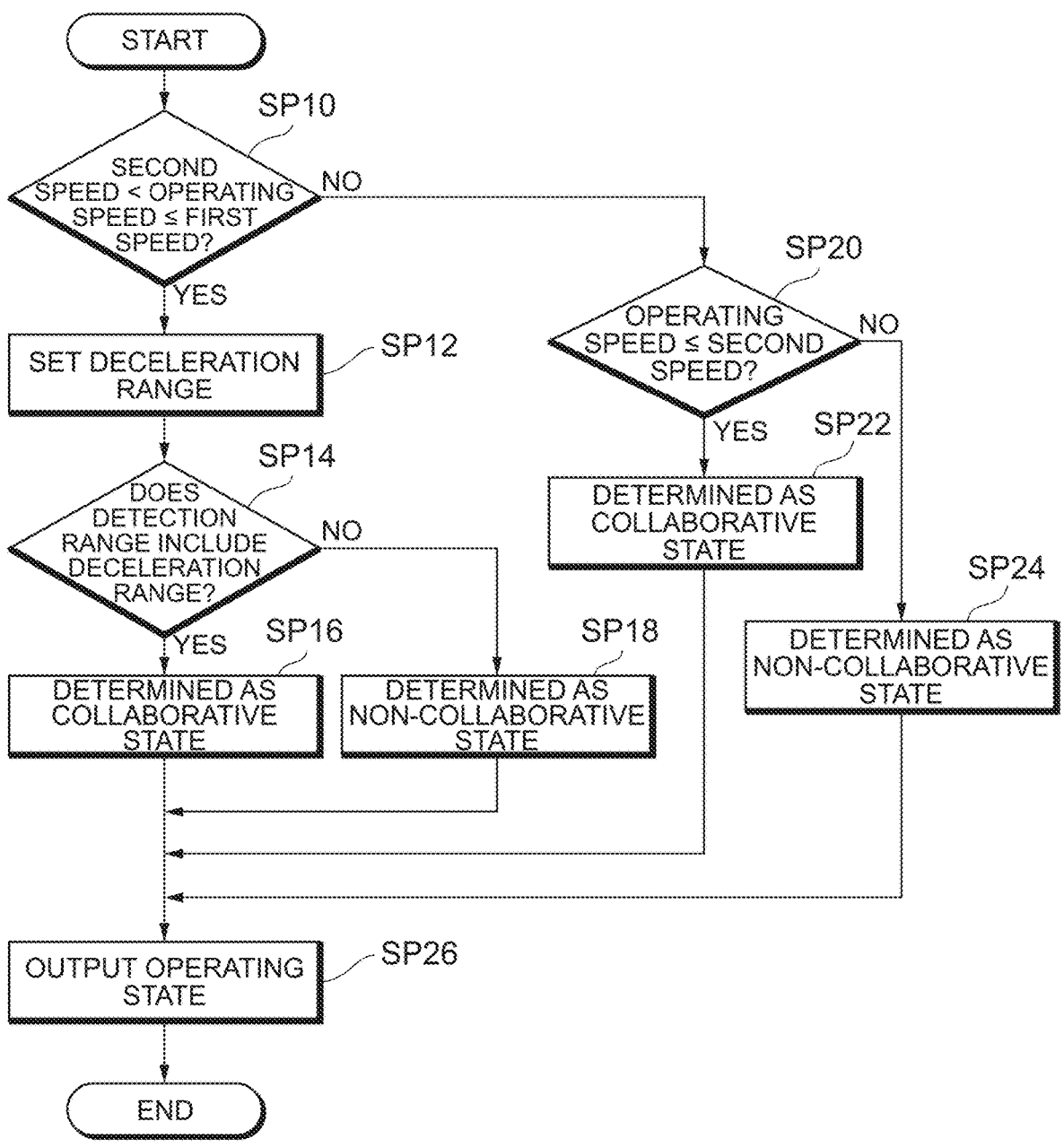
FIG. 4 is a flowchart showing a series of processes performed by a robot controller shown in FIG. 1.

The circuit configuration of the robot controller 10 has been described above. Next, a series of processes performed by the robot controller 10 will be described in detail. FIG. 4 is a flowchart showing the series of processes performed by the robot controller 10 shown in FIG. 1.

9

(Step SP10)

The speed determinator 13 in the robot controller 10 determines the magnitude relationship among the operating speed of the collaborative robot 20, the first speed v1, and the second speed v2. If the speed determinator 13 determines that the operating speed of the collaborative robot 20 is lower than or equal to the first speed v1 and higher than the second speed v2, the process proceeds to step SP12. On the other hand, if the speed determinator 13 determines that the operating speed of the collaborative robot 20 is lower than or equal to the second speed v2 or is higher than the first speed v1, the process proceeds to step SP20.

(Step SP12)

The range determinator 12 in the robot controller 10 sets the deceleration range A2 (set range). Specifically, the range determinator 12 in the robot controller 10 reads out the deceleration time ts and the third speed v3 from the memory 100 and multiplies the deceleration time is by the third speed v3. Further, the range determinator 12 in the robot controller 10 sets the deceleration range A2 (set range) such that the outer periphery of the deceleration range A2 is located far from the outer periphery of the collaborative range A1 (predetermined range) at least by a distance obtained by the multiplication result. The range determinator 12 stores the set deceleration range A2 (set range) in the memory 100. Then, the process proceeds to step SP14.

(Step SP14)

The range determinator 12 in the robot controller 10 determines whether or not the detection range A3 includes the deceleration range A2 (set range). If the range determinator 12 determines that the detection range A3 includes the deceleration range A2 (set range), the process proceeds to step SP16. On the other hand, if the range determinator 12 determines that the detection range A3 does not include the deceleration range A2 (set range), the process proceeds to step SP18.

(Step SP16)

The collaborative state determinator 14 in the robot controller 10 determines that the operating speed of the collaborative robot 20 is in the collaborative state. Then, the process proceeds to step SP26.

(Step SP18)

The collaborative state determinator 14 in the robot controller 10 determines that the operating speed of the collaborative robot 20 is in the non-collaborative state. Then, the process proceeds to step SP26.

(Step SP20)

If the speed determinator 13 determines, in the process of step SP20, that the operating speed of the collaborative robot 20 is lower than or equal to the second speed v2, the process proceeds to step SP22. On the other hand, if the speed determinator 13 determines, in the process of step SP20, that the operating speed of the collaborative robot 20 is higher than the second speed v2, the process proceeds to step SP24.

(Step SP22)

The collaborative state determinator 14 in the robot controller 10 determines that the operating speed of the collaborative robot 20 is in the collaborative state. Then, the process proceeds to step SP26.

(Step SP24)

The collaborative state determinator 14 in the robot controller 10 determines that the operating speed of the collaborative robot 20 is in the non-collaborative state. Then, the process proceeds to step SP26.

(Step SP26)

The outputter 15 in the robot controller 10 outputs the operating state of the collaborative robot 20 that has been determined by the collaborative state determinator 14, to the outside or the human 40. Then, the series of processes shown in FIG. 4 is ended.

Effects

As described above, in the first embodiment, the robot controller 10 determines whether or not the detection range A3 includes the deceleration range A2 (set range) set for the collaborative robot 20, and determines the magnitude relationship between the operating speed of the collaborative robot 20 and the first speed v1. Further, based on each determination result, the robot controller 10 determines whether the operating state of the collaborative robot 20 is either the collaborative state or the non-collaborative state. Therefore, the robot controller 10 can determine with high accuracy whether the operating state of the collaborative robot 20 is either the collaborative state or the non-collaborative state.

In the first embodiment, the robot controller 10 determines that the operating state of the collaborative robot 20 is the collaborative state when the detection range A3 includes the deceleration range A2 (set range) and the operating speed of the collaborative robot 20 is lower than or equal to the first speed v1. Therefore, the robot controller 10 can determine the operating state of the collaborative robot 20 based on whether or not the setting of the detection range A3 and the operating speed of the collaborative robot 20 are appropriate.

In the first embodiment, the robot controller 10 determines that the operating state of the collaborative robot 20 is the collaborative state when the operating speed of the collaborative robot 20 is lower than or equal to the second speed v2. Therefore, the robot controller 10 can determine that the operating state of the collaborative robot 20 is the collaborative state when the operating speed of the collaborative robot 20 is lower than or equal to the second speed v2, regardless of the setting of the detection range A3.

In the first embodiment, the robot controller 10 sets the deceleration range A2 (set range) for the collaborative robot 20 in accordance with the deceleration time ts, the third speed v3 regarding the movement of the human 40, and the collaborative range A1 (predetermined range). Therefore, the robot controller 10 can set the deceleration range A2 for the collaborative robot 20 in consideration of the movement speed of the human 40.

Second Embodiment

Subsequently, a second embodiment will be described. In the second embodiment described below, the same component as that in the first embodiment is denoted by the same reference character, and thus its description will be omitted.

<Configuration>

Figure 5:
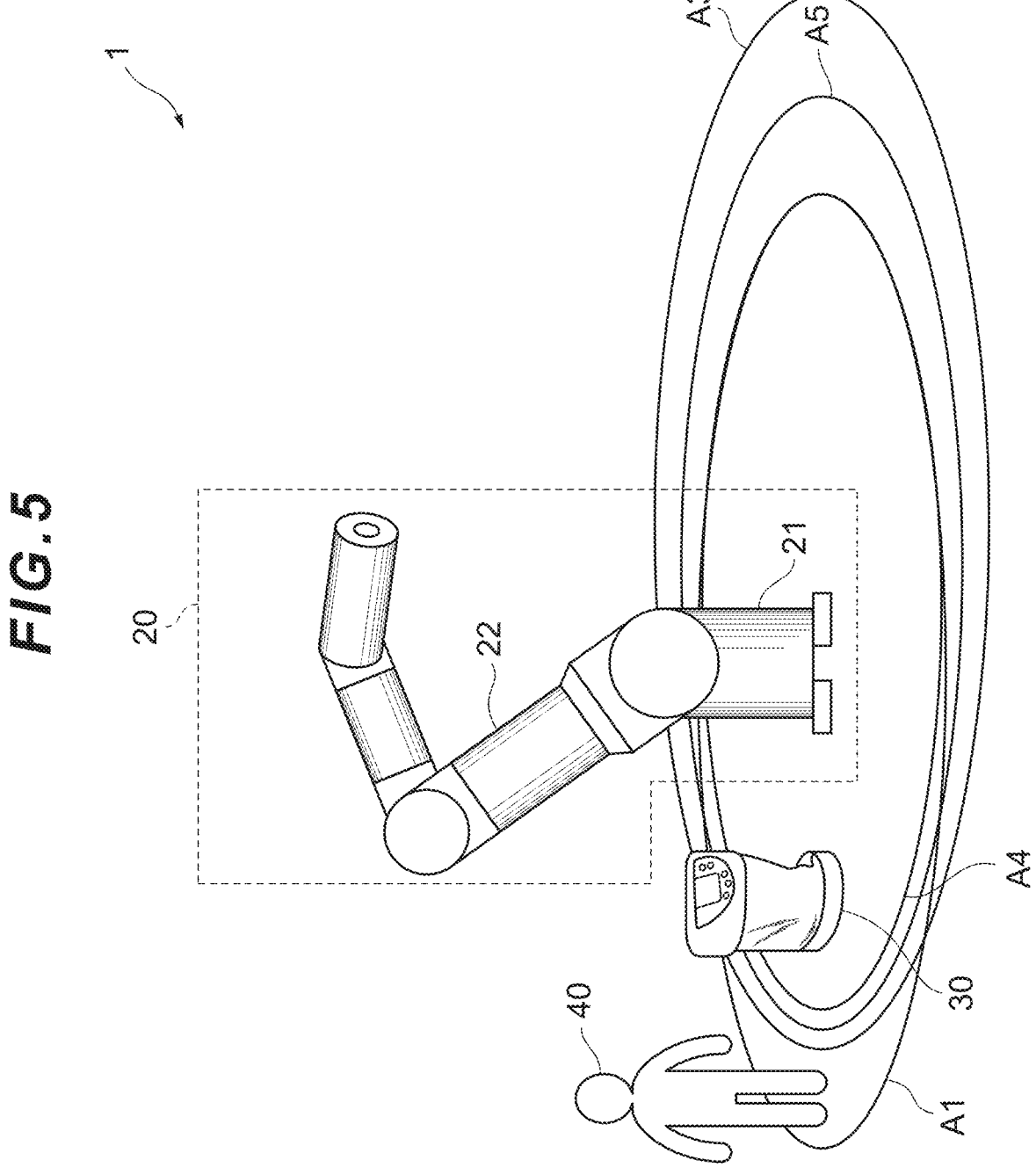
FIG. 5 is a diagram schematically showing a configuration of a robot control system according to a second embodiment.

FIG. 5 is a diagram schematically showing a configuration of a robot control system 1 according to the second embodiment. As shown in FIG. 5, in the second embodiment, the robot control system 1 of the second embodiment differs from the robot control system 1 of the first embodiment only in that the set range is changed from the deceleration range A2 to a deceleration range A5, and further that the predetermined range is changed from the collaborative range A1 to an operating range A4 where the collaborative robot 20 operates. That is, in the second embodiment, the predetermined range is the operating range A4. Further, in the second embodiment, the set range is the deceleration range A5.

In the second embodiment, the collaborative state is a state in which the collaborative robot 20 is operable with the human 40 when the human 40 may enter the predetermined range regarding the collaborative robot 20 (operating range A4 in the second embodiment). The non-collaborative state is a state in which the collaborative robot 20 is not operable with the human 40 when the human 40 may enter the predetermined range (operating range A4 in the second embodiment).

The operation of the robot controller 10 in the second embodiment will be described. For the collaborative robot 20, the robot controller 10 sets the operating range A4 (predetermined range), which is a part of the collaborative range A1 where the articulated arm 22 of the collaborative robot 20 operates, as well as the deceleration range A5 (set range), which is wider than the operating range A4 by a predetermined distance. From the information transmitted from the detection device 30, the robot controller 10 acquires the detection range A3 set on the detection device 30. The robot controller 10 calculates an operating speed of the collaborative robot 20 in accordance with information transmitted from the collaborative robot 20. Further, the robot controller 10 determines whether the collaborative robot 20 is in either the collaborative state or the non-collaborative state, based on the detection range A3, the deceleration range A5 (set range), and the operating speed of the collaborative robot 20, and then outputs the determination result to the outside so that the human 40 can recognize it. However, the robot controller 10 may output the determination result about whether the collaborative robot 20 is in either the collaborative state or the non-collaborative state to an external device different from the robot controller 10 (such as a control system, a display, a lamp, or a speaker, not shown, of facilities, including a factory where the collaborative robot 20 is disposed).

In the second embodiment, the collaborative range information 111 stored in the memory 100 further includes information about the operating range A4 (location, size, or the like) and information about the deceleration range A5 (location, size, or the like).

In the second embodiment, the range determinator 12 sets the deceleration range A5 (set range) in accordance with the deceleration time ts during which the operating speed of the collaborative robot 20 is reduced from the first speed v1 to the second speed v2, the third speed v3 regarding the moving speed of the human 40, and the operating range A4. Specifically, the range determinator 12 reads out the deceleration time ts and the third speed v3 from the memory 100 and multiplies the deceleration time ts by the third speed v3. The range determinator 12 sets the deceleration range A5 (set range) such that the outer periphery of the deceleration range A5 is located far from the outer periphery of the operating range A4 (predetermined range) at least by a distance obtained by the multiplication result. The range determinator 12 stores the set deceleration range A5 (set range) in the memory 100.

Effects

As described above, in the second embodiment, the range determinator 12 of the robot controller 10 sets the deceleration range A5 (set range) in accordance where the collaborative range A4 (predetermined range) where the collaborative robot 20 operates, the deceleration time ts, and the third speed v3. Therefore, the robot controller 10 can set the deceleration range A5 (set range) for the collaborative robot 20 in consideration of the operating range A4 where the collaborative robot 20 operates.

Modification

The present invention is not limited to the embodiment described above. That is, the above embodiments that are modified in design as appropriate by a person skilled in the art may be included in the scope of the present invention as long as they have the features of the present invention. Furthermore, respective elements included in the above embodiments and modifications mentioned later can be combined to the extent technically possible, and these combinations may be included in the scope of the present invention as long as they have the features of the present invention.

For example, the controller 17 may reduce the moving speed of the collaborative robot 20 to the second speed v2 when receiving the detection result that is transmitted from the detection device 30 indicating that the human 40 is present within the detection range A3. Thereafter, the controller 17 may accelerate the operating speed of the collaborative robot 20 to the predetermined speed of lower than or equal to the first speed v1 if the detection result transmitted from the detection device 30 shows that the human 40 is not present within the detection range A3. With this configuration, the robot controller 10 can efficiently operate the collaborative robot 20 in accordance with whether or not the human 40 is present within the detection range A3.

The robot controller 10 may transmit, to the detection device 30, the information about the deceleration range A2 including the collaborative range information 111 so as to be able to use this information when the detection device 30 sets the detection range A3. With this configuration, the robot controller 10 can assist in setting the detection range A3 of the detection device 30.

In FIGS. 1, 3, and 5, the collaborative range A1, the deceleration ranges A2 and A5, the operating range A4, and the detection range A3 are depicted as the areas on the plane horizontal to a mounting surface of the collaborative robot 20, but they are not limited to this. The collaborative range A1, the deceleration ranges A2 and A5, the operating range A4, and the detection range A3 include not only the areas on the plane horizontal to the mounting surface of the collaborative robot 20, but also a range of the space in all directions where the collaborative robot 20 can be provided.

What is claimed is:

1. A robot controller comprising:

an acquisitor acquiring a prescribed detection range from a detection device detecting a human present in the detection range;

a range determinator determining whether or not the detection range acquired by the acquisitor includes a set range that is set for a collaborative robot collaborating with the human so as to include a predetermined range regarding the collaborative robot;

a speed determinator determining a magnitude relationship between an operating speed of the collaborative robot and a first speed; and a collaborative state determinator determining whether an operating state of the collaborative robot is either a collaborative state or a non-collaborative state in accordance with determination results of the range determinator and the speed determinator, the collaborative state being a state in which the collaborative robot is operable with the human when the human enters the predetermined range, the non-collaborative state being a state in which the collaborative robot is not operable with the human when the human enters the predetermined range, wherein the collaborative state determinator determines that the operating state is the collaborative state when the determination result of the range determinator is an affirmative determination that the detection range includes the set range and the speed determinator determines that the operating speed is lower than or equal to the first speed, wherein the speed determinator further determines a magnitude relationship between the operating speed and a second speed that is lower than the first speed, and wherein the collaborative state determinator determines that the operating state is the collaborative state when the speed determinator indicates that the operating speed is lower than or equal to the second speed, wherein the predetermined range is a predetermined collaborative range from the collaborative robot, and wherein the range determinator sets the set range in accordance with a time during which the operating speed is reduced from the first speed to the second speed, a third speed regarding a moving speed of the human, and the collaborative range.

2. A robot control system comprising:

a collaborative robot collaborating with a human;

an acquisitor acquiring a prescribed detection range from a detection device detecting the human present in the detection range;

a range determinator determining whether or not the detection range acquired by the acquisitor includes a set range that is set for the collaborative robot so as to include a predetermined range regarding the collaborative robot;

a speed determinator determining a magnitude relationship between an operating speed of the collaborative robot and a first speed; and a collaborative state determinator determining whether an operating state of the collaborative robot is either a collaborative state or a non-collaborative state in accordance with determination results of the range determinator and the speed determinator, the collaborative state being a state in which the collaborative robot is operable with the human when the human enters the predetermined range, the non-collaborative state being a state in which the collaborative robot is not operable with the human when the human enters the predetermined range, wherein the collaborative state determinator determines that the operating state is the collaborative state when the determination result of the range determinator is an affirmative determination that the detection range includes the set range and the speed determinator determines that the operating speed is lower than or equal to the first speed, wherein the speed determinator further determines a magnitude relationship between the operating speed and a second speed that is lower than the first speed, and wherein the collaborative state determinator determines that the operating state is the collaborative state when the speed determinator indicates that the operating speed is lower than or equal to the second speed, wherein the predetermined range is a predetermined collaborative range from the collaborative robot, and wherein the range determinator sets the set range in accordance with a time during which the operating speed is reduced from the first speed to the second speed, a third speed regarding a moving speed of the human, and the collaborative range.

3. A robot controller comprising:

an acquisitor acquiring a prescribed detection range from a detection device detecting a human present in the detection range;

a range determinator determining whether or not the detection range acquired by the acquisitor includes a set range that is set for a collaborative robot collaborating with the human so as to include a predetermined range regarding the collaborative robot;

a speed determinator determining a magnitude relationship between an operating speed of the collaborative robot and a first speed; and a collaborative state determinator determining whether an operating state of the collaborative robot is either a collaborative state or a non-collaborative state in accordance with determination results of the range determinator and the speed determinator, the collaborative state being a state in which the collaborative robot is operable with the human when the human enters the predetermined range, the non-collaborative state being a state in which the collaborative robot is not operable with the human when the human enters the predetermined range, wherein the collaborative state determinator determines that the operating state is the collaborative state when the determination result of the range determinator is an affirmative determination that the detection range includes the set range and the speed determinator determines that the operating speed is lower than or equal to the first speed, wherein the speed determinator further determines a magnitude relationship between the operating speed and a second speed that is lower than the first speed, and wherein the collaborative state determinator determines that the operating state is the collaborative state when the speed determinator indicates that the operating speed is lower than or equal to the second speed, wherein the predetermined range is an operating range in which the collaborative robot operates, and wherein the range determinator sets the set range in accordance with a time during which the operating speed is reduced from the first speed to the second speed, a third speed regarding a moving speed of the human, and the operating range.

4. A robot control system comprising:

a collaborative robot collaborating with a human;

an acquisitor acquiring a prescribed detection range from a detection device detecting the human present in the detection range;

a range determinator determining whether or not the detection range acquired by the acquisitor includes a set range that is set for the collaborative robot so as to include a predetermined range regarding the collaborative robot;

a speed determinator determining a magnitude relationship between an operating speed of the collaborative robot and a first speed; and a collaborative state determinator determining whether an operating state of the collaborative robot is either a collaborative state or a non-collaborative state in accordance with determination results of the range determinator and the speed determinator, the collaborative state being a state in which the collaborative robot is operable with the human when the human enters the predetermined range, the non-collaborative state being a state in which the collaborative robot is not operable with the human when the human enters the predetermined range, wherein the collaborative state determinator determines that the operating state is the collaborative state when the determination result of the range determinator is an affirmative determination that the detection range includes the set range and the speed determinator determines that the operating speed is lower than or equal to the first speed, wherein the speed determinator further determines a magnitude relationship between the operating speed and a second speed that is lower than the first speed, and wherein the collaborative state determinator determines that the operating state is the collaborative state when the speed determinator indicates that the operating speed is lower than or equal to the second speed, wherein the predetermined range is an operating range in which the collaborative robot operates, and wherein the range determinator sets the set range in accordance with a time during which the operating speed is reduced from the first speed to the second speed, a third speed regarding a moving speed of the human, and the operating range.

\* \* \* \* \*

16